United States Patent
Lee

(10) Patent No.: US 7,809,266 B2
(45) Date of Patent: Oct. 5, 2010

(54) METHOD AND APPARATUS FOR PROVIDING DATA CONFIDENTIALLY FOR VERY HIGH-SPEED MULTIPLE-WAVELENGTH OPTICAL DATA LINKS

(75) Inventor: Michael Lee, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 1219 days.

(21) Appl. No.: 10/279,791

(22) Filed: Oct. 25, 2002

(65) Prior Publication Data

US 2004/0081471 A1 Apr. 29, 2004

(51) Int. Cl.
*H04J 14/00* (2006.01)

(52) U.S. Cl. ............................. 398/68; 398/69; 398/77
(58) Field of Classification Search ............ 398/66–73, 398/202–214, 181–198, 77
See application file for complete search history.

(56) References Cited

U.S. PATENT DOCUMENTS

| | | | | |
|---|---|---|---|---|
| 6,577,732 | B1 * | 6/2003 | Kartalopoulos | 380/33 |
| 6,580,538 | B1 * | 6/2003 | Kartalopoulos | 398/79 |
| 6,820,230 | B2 * | 11/2004 | Sweeney | 714/776 |
| 2002/0075903 | A1 * | 6/2002 | Hind | 370/503 |
| 2002/0126700 | A1 * | 9/2002 | Rokugo | 370/469 |
| 2002/0126789 | A1 * | 9/2002 | Georges et al. | 375/377 |
| 2004/0132454 | A1 * | 7/2004 | Trott et al. | 455/447 |
| 2004/0208565 | A1 * | 10/2004 | Roberts et al. | 398/79 |

* cited by examiner

*Primary Examiner*—Dzung D Tran
(74) *Attorney, Agent, or Firm*—Christopher & Weisberg, P.A.

(57) ABSTRACT

A DWDM optical system in a first embodiment includes a plurality of scramblers on the transmit side and a plurality of corresponding de-scramblers on the receiver side of the DWDM system. Each scrambler includes an input for an encryption key with the corresponding de-scrambler including an input for the same encryption key. In accordance with the pseudorandom encryption key, input data channels are scrambled onto output optical channels to provide data security across the optical path. With a suitable algorithm, this technique can provide very strong data confidentiality. The strength of the technique of the embodiments of the invention resides in the scrambling algorithm that is used to scramble the data over the optical carriers. Preferably the scrambling algorithm is very unpredictable and does not repeat for a very long time.

14 Claims, 5 Drawing Sheets

METHOD AND APPARATUS FOR PROVIDING DATA CONFIDENTIALLY FOR VERY HIGH-SPEED MULTIPLE-WAVELENGTH OPTICAL DATA LINKS

FIELD OF THE INVENTION

The present invention relates to method and apparatus for providing data confidentially for very high-speed multiple wavelength optical data links.

BACKGROUND OF THE INVENTION

With any fiber optic transmission it is possible for a sufficiently motivated attacker to tap the fiber line and eavesdrop on the data channels within the fiber. To tap a fiber link an attacker would scrape off the cladding from the optical cable and bend the cable in such a way that enough optical signal is coupled to the attackers optical receiver. Other than a slight signal loss there is no indication to the system that the cable has been tapped in such a way since this tapping does not destroy the data link and is non-intrusive. Of course an attacker would need physical access to the fiber cable to do this, but in a long haul system the fiber is very long and there are many opportunities for a sufficiently motivated attacker to have this physical access.

Currently there is no data confidentiality mechanism applied to high-speed optical data. For lower speed data links it is possible to apply digital encryption of data using encryption algorithms such as advanced encryption standard (AES) and digital encryption standard (DES or triple-DES). Use of these protocols on a high-speed optical link is currently not possible due to the very large quantity and high-speed of the data which can be greater than 10 Gigabits/second on a single wavelength, and greater than 40 wavelengths on a single fiber. Encryption protocols are complex and involve many different operations on the data and as such are limited in speed even when implemented in hardware.

It would be possible to encrypt individual lower speed data channels before being multiplexed onto the high-speed optical fiber. This will only protect the individual data channels however should the fiber be tapped, and not the bulk optical data being sent over the fiber. Encrypting all lower speed channels would be prohibitively costly due to the large amount of data which would require many very powerful hardware encryption engines. This invention presents a low cost solution that will protect all bulk traffic on the fiber link at once.

SUMMARY OF THE INVENTION

Accordingly, the present invention provides a simple approach to provide data confidentiality for very high-speed optical data links.

High-speed optical data links transmit data at very high speeds on a multitude of wavelengths over a fiber optic channel. It is currently possible for a motivated attacker to eavesdrop on a fiver optic link. Encryption of data using standard encryption techniques and protocols such as advanced encryption standard (AES) is currently not possible on a very high-speed optical link due to the high speeds involved.

The present invention proposes a method that takes advantage of the multiple wavelengths within the fiber and mixes the data over many wavelengths according to a specific encryption key. The data can be recovered at the far end only using the same specific encryption key.

This has the advantage that any attacker who taps the optical line would not be in possession of the specific key and would not be able to recover the data.

In accordance with an aspect of the invention there is provided a method of transmitting data in a dense mode wavelength division multiplex optical system comprising the steps of selectively combining data from a plurality of data channels in a corresponding plurality of optical channels in accordance with an encryption key, transmitting the plurality of optical channels, receiving the plurality of optical channels, and selectively de-combining the data from the plurality of optical channels to receive the plurality of data channels in accordance with the encryption key.

In accordance with another aspect of the invention there is provided apparatus for transmitting data in a dense-mode wavelength division multiplex optical system comprising a plurality of data scramblers, each having a plurality of inputs for data channels, an input for an encryption key and an output for a scrambled data channel, a plurality of data de-scramblers, each having a plurality of inputs for scrambled data channels and input for an encryption key and an output for a recovered data channel, and an optical fiber transport coupling the data scramblers and de-scramblers.

In accordance with a further aspect of the invention there is provided apparatus for transmitting data in a dense-mode wavelength division multiplex optical system comprising a data scrambler having a plurality of inputs for data channels, an input for an encryption key and an output for a scrambled data channel, a data de-scrambler having a plurality of inputs for scrambled data channels and input for the encryption key and an output for a recovered data channel and an optical fiber transport coupling the data scrambler and de-scrambler.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 1:
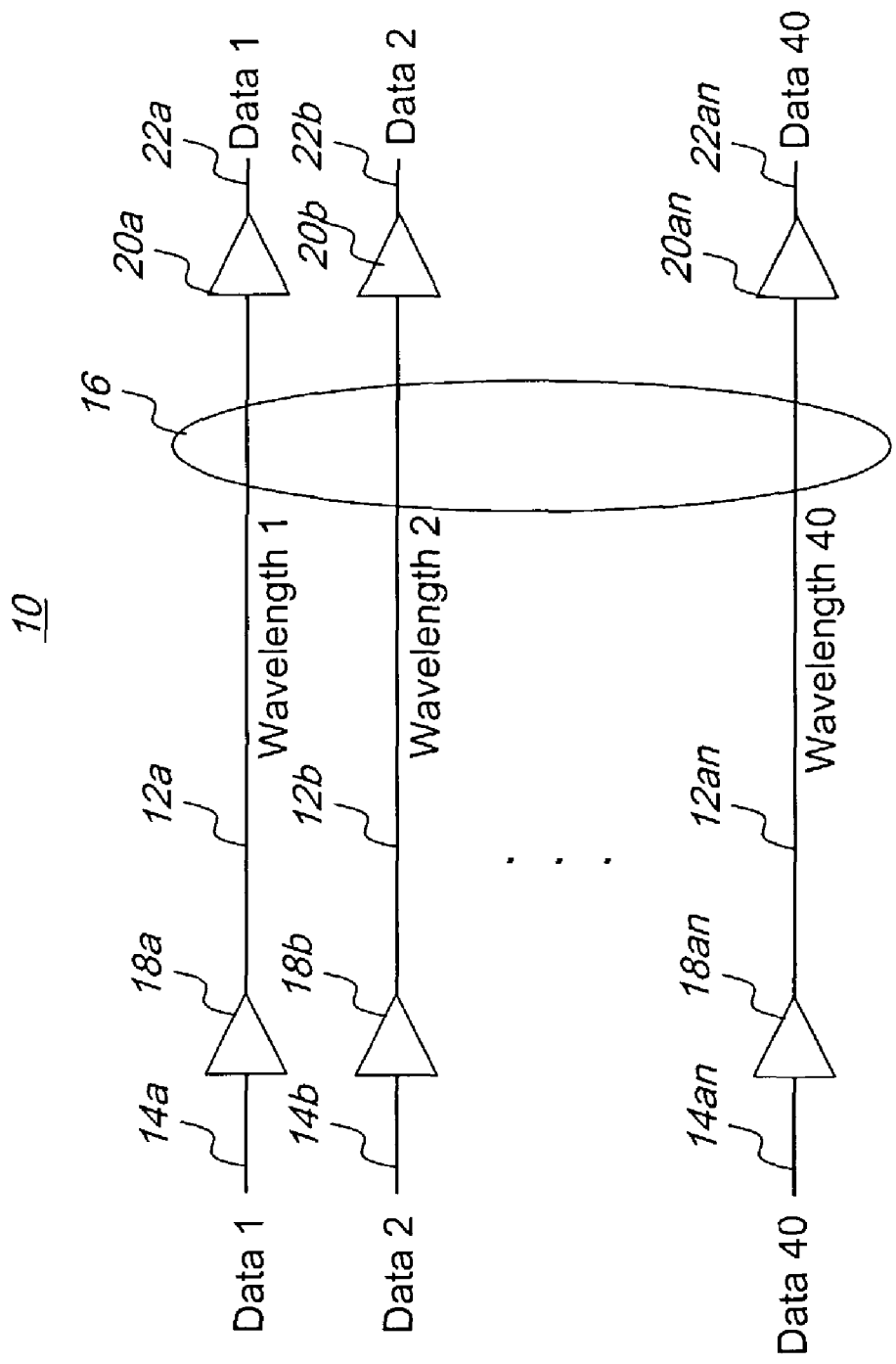
FIG. 1 illustrates in a high-level block diagram a known DWDM optical system.

Referring to FIG. 1, there is illustrated in a high-level block diagram a known DWDM system. The known DWDM (Dense Wavelength Division Multiplex) optical system 10 of FIG. 1 includes up to 40 discreet wavelengths 12*a*-12*an* for carrying 40 data channels 14*a*-14*an* on a single fiber 16. Each span includes the fiber 16 and 40 optical transmitters 18*a*-18*an* and corresponding receivers 20*a*-20*an* for received data channels 22*a*-22*an*.

In a normal high-speed dense wavelength division multiplex system 10 (DWDM), 40 or more wavelengths of light are transmitted by a multitude of optical transmitters 18*a*-18*an* over a single fiber 16 and received at the far end by a multitude of optical receivers 20*a*-20*an*. Each wavelength 12 carries a single high-speed serial data channel 14. For example, in a 10 Gigabit/40-wavelengh optical system, each wavelength of light carries a 10 Gigabits per second serial digital bit stream. Optical transmitter 18a transmits high-speed data stream 14a over optical wavelength 12a to optical receiver 20a, and Optical transmitter 118b transmits high-speed data stream 14b over optical receiver 2. For this description please assume a system with 40 different wavelengths and 40 corresponding data streams are present.

In a typical optical system, an attacker, at some point along the length of the fiber, could tap into the fiber by scraping off the cladding and looping the fiber. If the attacker were to place an optical receiver corresponding to one of the wavelengths in the fiber next to the fiber they could recover the optical data stream being carried on that wavelength. For example, an attacker with a receiver corresponding to wavelength 12an could recover data stream 14an. To make mattes worse, the tapping of one of the wavelengths would be undetectable, appearing as a slight drop in signal level that would be indistinguishable from normal operation of the system.

Figure 2:
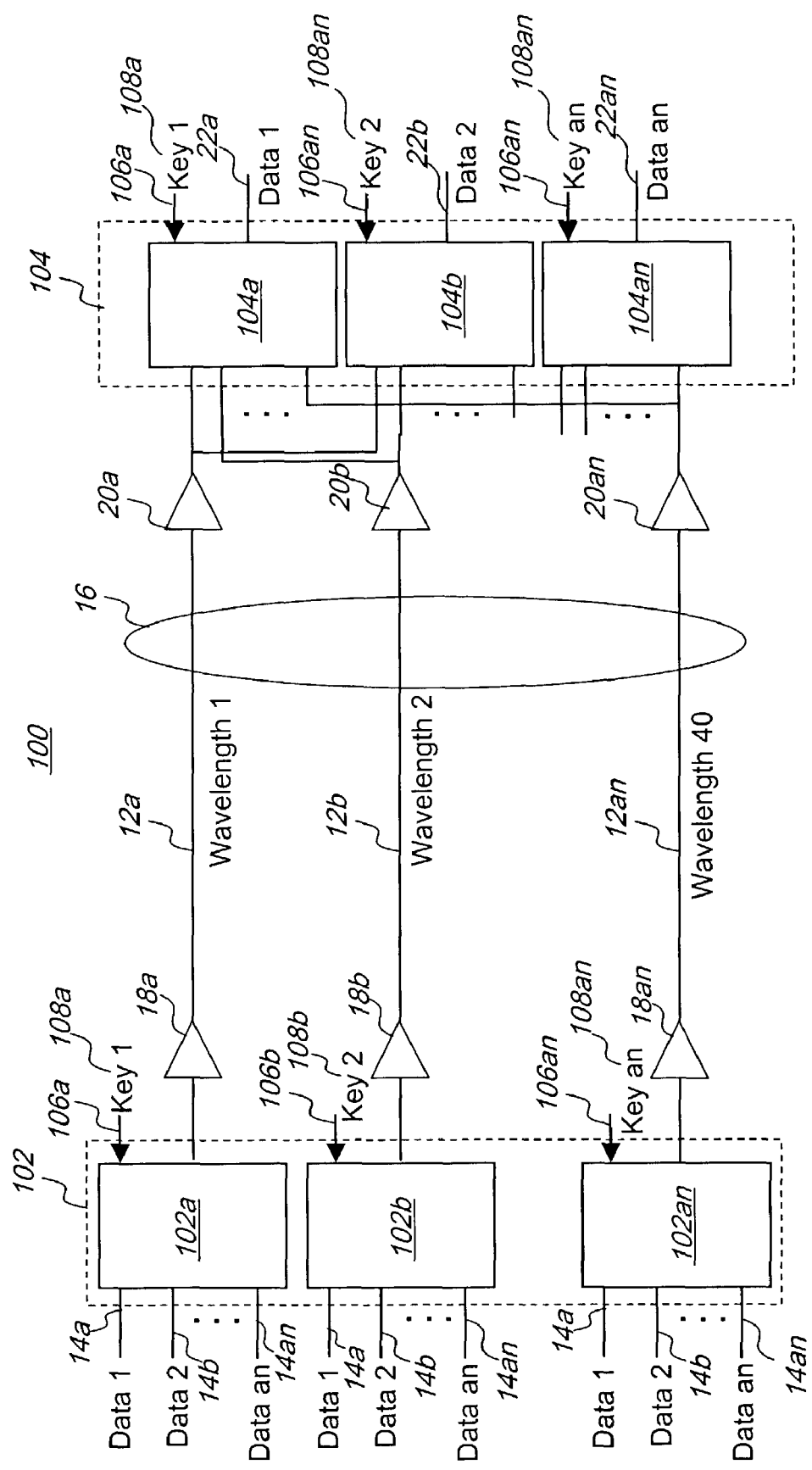
FIG. 2 illustrates in a high-level block diagram a DWDM optical system in accordance with a first embodiment of the present invention.

Referring to FIG. 2 there is illustrated in a high-level block diagram a DWDM optical system in accordance with a first embodiment of the present invention. The DWDM optical system 100 includes a plurality of scramblers 102a-102an on the transmit side and a plurality of corresponding de-scramblers 104a-104an on the receiver side of the DWDM system 100. Each scrambler 102 includes an input 106 for a key 108 with the corresponding de-scrambler 104 including an input 110 for the key 108.

In operation, the embodiment of the present invention of FIG. 2 prevents the wiretapping vulnerability, discussed in connection with FIG. 1. The individual data streams 14a through 14an are applied to a digital scrambler ASIC 102. This digital scrambler takes portions from the data streams 14a through 14an and combines them to produce a new digital bit stream "new data 1" according to a secret key 108. This new bit stream is then applied to the optical transmitter 18a and sent over optical wavelength 12a to the far end. At the far end, the optical receiver 20a receives the new bit stream that is composed of portions of the original bit streams 14a through 14an. Likewise, the other optical receivers recover bit streams that are composed of a combination of portions of the original 40 bit streams according to corresponding secret keys. By applying all the bit streams recovered by all the receivers to a digital de-scrambler ASIC 104, the original data 14 can be recovered according to the key 108a. Likewise all other original data streams 14b through 14an can be recovered according to the corresponding scrambling keys 108b through 108an.

Since scrambling the data according to the key provides this security, the circuitry to implement the embodiment of FIG. 2 is quite simple and can be implemented with sufficient speed to allow protection of the entire high-speed optical link. Any attacker who taps the optical line and recovers data from any particular wavelength would not have enough data to re-create the original data since only a portion of that data is present on any particular wavelength. Even if an attacker were to tap the line and recover data from all 40 wavelengths they would still not be able to recover the original data since the attacker would not have the scrambling/de-scrambling key corresponding to a particular data stream. The key is sufficiently long (e.g. 128 bits) such that guessing the key would be impossible with known techniques.

Figure 3:
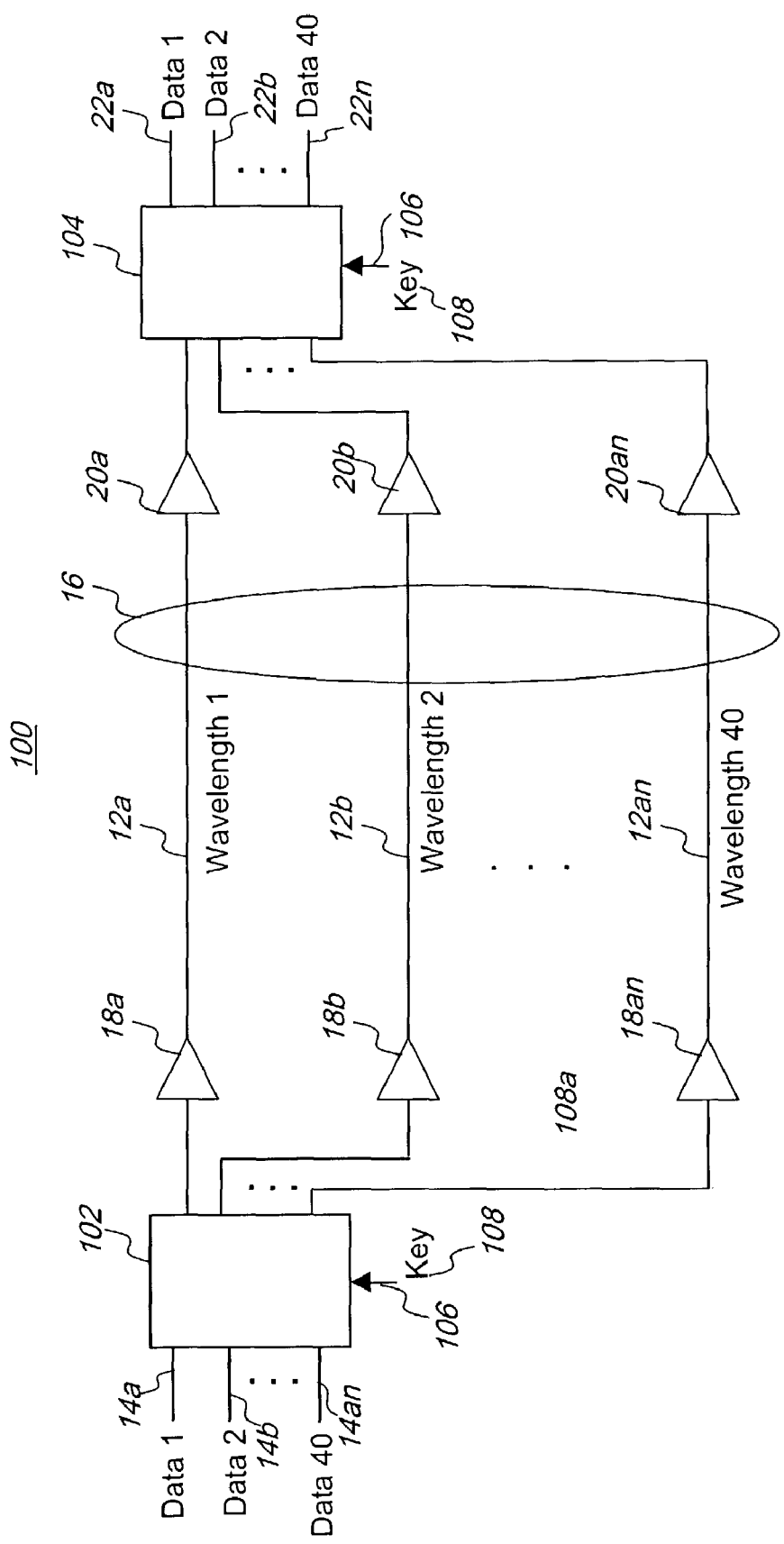
FIG. 3 illustrates in a high-level block diagram a DWDM optical system in accordance with a second embodiment of the present invention.

Referring to FIG. 3 there is illustrated in a high-level block diagram a DWDM optical system in accordance with a second embodiment of the present invention. The DWDM optical system 100 includes a scrambler 102 on the transmit side and a corresponding de-scrambler 104 on the receiver side of the DWDM system 100. The scrambler 102 includes an input 106 for a key 108 with the corresponding de-scrambler 104 including an input 110 for the key 108.

In operation, the embodiment of the present invention of FIG. 3 is similar to the embodiment of FIG. 2, except that the scrambler/de-scrambler are simpler because they are combined into a single scrambler, but must use more complex circuitry in order to be able to combine them. The system of FIG. 2 is able to encrypt a single wavelength on the optical fiber by employing only one scrambler (e.g system of 102a, 18a, 12a, 20a, and 104a). This may be advantageous if only a single wavelength on the fiber is required to be encrypted, for example, if a particular customers purchase one wavelengths from a service provider and requires encryption. (Only the particular customer would have the key to decrypt the data on their particular wavelength). The system of FIG. 3 encrypts all data on all wavelengths of the fiber is a bulk mode. The system of FIG. 2 requires multiple keys (e.g. 40 in this example) and thus the compromise of only one key does not affect the security of the other 39 wavelenths.

The system of FIG. 3 depends on the single key for the security of all the wavelengths. While security of this single key is critical, the key management problem is much simpler since there is only one key.

Figure 4:
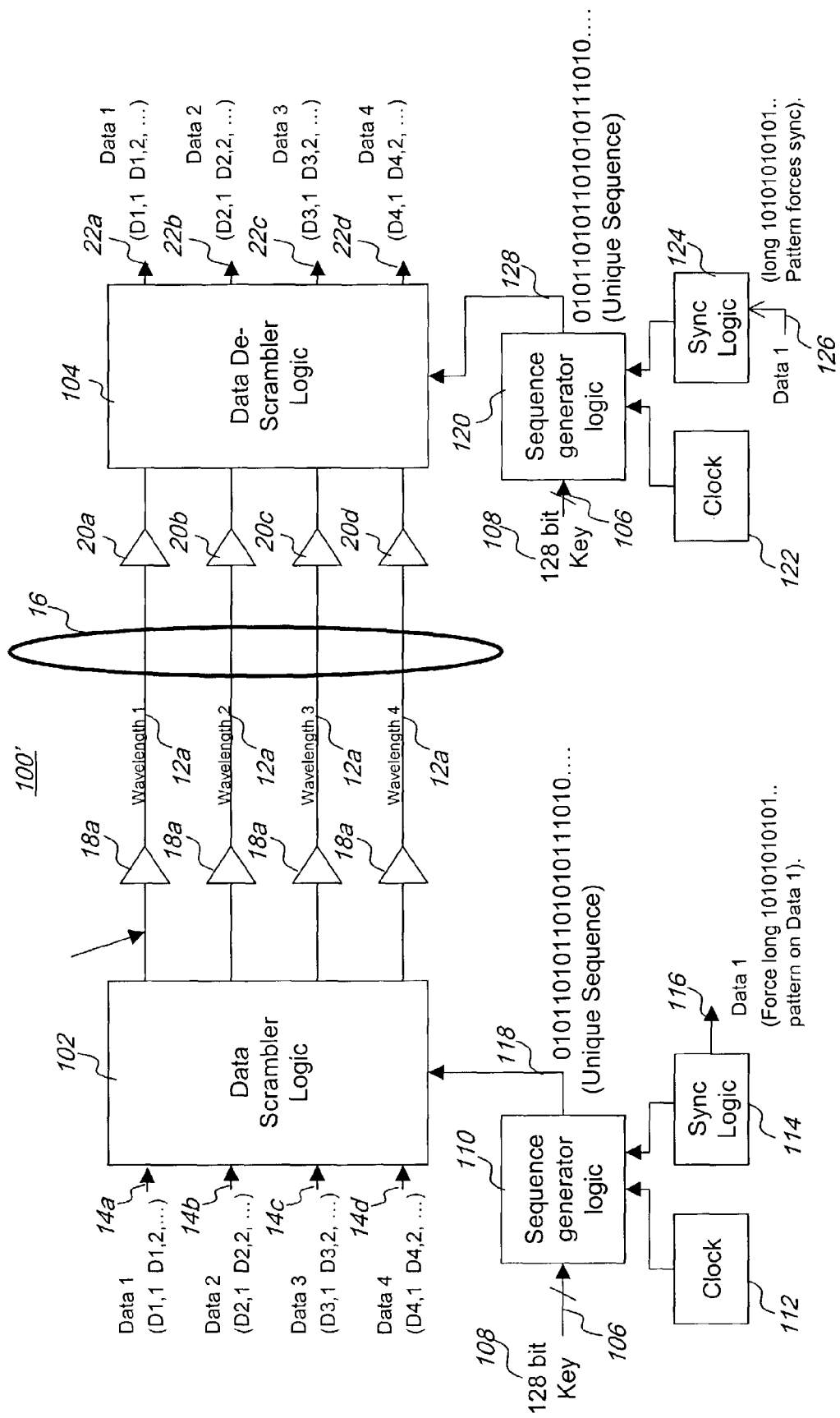
FIG. 4 illustrates a simplified example of the second embodiment of FIG. 3.

Referring to FIG. 4, there is illustrated a simplified example of the second embodiment of FIG. 3. By way of this example, operation of the embodiment of FIG. 3 will be described in further detail. In the present example the number of wavelengths has been reduced to four to simplify the description. In FIG. 4, the key inputs 106 have been expanded to illustrate a possible implementation of the key/pseudorandom sequence generation circuit. On the transmit side, there is included a sequence generator logic 110, a clock 112, and a sync logic 114 having an output 116. The sequence generator logic 110 has an output 118 coupled to the data scrambler logic 102. There is corresponding circuitry on the receive side, a sequence generator logic 120, a clock 122, and a sync logic 124 having an input 126. The sequence generator logic 120 has an output 128 coupled to the data scrambler logic 104.

Figure 5:
FIG. 5 illustrates in a table the scrambled data transmitted with the simplified example of FIG. 4.

Referring to FIG. 5 there is illustrated in a table the scrambled data transmitted with the simplified example of FIG. 4. Operation of the example of the embodiment of FIG. 3 is now provided with reference to FIGS. 4 and 5.

This example shows a 4 wavelength system for illustration purposes only. For security, the system must include at least 10 wavelengths since we must combine enough channels to make the probability of having the exact same data sequence on each channel very small.

The sync generator logic 114 and 124 ensures that the sequence generator is synchronized at both ends of the fiber optic channel. To force synchronization at the start of transmission or periodically, the scrambling algorithm is stopped and an alternating 1s and 0s pattern is sent for a specified long time on one wavelength #1, as indicated at output 116 and input 126.

The 128-bit key 108 sets the initial state of the sequence generator logic 110 and 120 (after forced synchronization). Without the exact 128-bit key, there is a negligibly small probability that an attacker could generate the same sequence, hence could not de-scramble the data.

The 128 bit key can be first delivered "out of band" over a different channel that the fiber optic channel. (e.g., data channel, email, phone call, initial equipment setting). After the initial key is delivered the key can subsequently be changed over the encrypted fiber channel.

The table in FIG. 5 gives an example of what the scrambled data might look like on the different wavelengths carried on the single fiber.

The strength of data confidentiality provided by the data scrambling technique of the embodiments of the present invention described herein depends upon the scrambling algorithm used. With a suitable algorithm, this technique can provide very strong data confidentiality.

The strength of the technique of the embodiments of the invention resides in the scrambling algorithm that is used to scramble the data over the optical carriers. Preferably the scrambling algorithm is very unpredictable and does not repeat for a very long time. Using a scrambling algorithm meeting the criteria of being very unpredictable and non-repeating for a long period allows scrambling the data over a smaller number of optical channels (e.g. 10), with almost as same strong security as doing so for 40 optical channels. However, combining the data of 40 channels (beyond a smaller number of channels) has the further advantage of providing protection for 40 optical channels simultaneously.

For the purposes of evaluating the strength of embodiments of the present invention, they are analyzed by comparing them to a "stream cipher" algorithm. While the embodiments of the present invention are not a stream cipher, they can be analyzed this way for the purpose of determining strength. The strength of a stream cipher lies somewhere between perfect (or unconditional) security and something less than that, depending upon the unpredictability of the scrambling algorithm that is used. While it is not possible to mathematically determine the exact strength of the algorithm between these two bounds, embodiments of the present invention can be conservatively be made to have equivalent security to that of an 80-bit key symmetric block cipher system. This level of security is considered quite secure with a brute force attack resistance of $2^{80}$ combinations, which is a very large number. ($1.21 \times 10^{24}$). To put this in perspective, if one had 1 million computers, each trying 1 million keys per second, it would still take 920,000 years to try all the key combinations.

The security of this type of system is all related to how well one performs the scrambling algorithm. If the scrambling algorithm is never repeated and is truly statistically random, it would be the equivalent of a "one-time pad". A one-time pad is the only security algorithm that is capable of perfect or unconditional security. This means that no matter how much cipher text an attacker has, there is not enough information to recover the plaintext. This unconditional security results from the fact that the cipher text can be resolved into an infinite number of equally possible plaintext messages, and there is no way for the attacker to know what the true message was despite unlimited computing power. Since the scrambling algorithm never repeats, even if the attacker somehow got a segment of the scrambling sequence it would not be useful for any other of the data.

The scrambling algorithm provided by embodiments of the present invention cannot of course be perfect. It cannot be truly random, and it repeats at some point because it is generated by hardware that is by nature deterministic.

To address the problem of the scrambling sequence being repetitive, the solution is to make the bit stream repeat at some very high multiple of the bits being transmitted, so it appears to be non-repetitive at least for the segment being sent. In embodiments of the invention the key for the scrambling generator will be changed often, for example every day. In a single day, at 10 gigabits/second an optical channel would send $2^{49}$ bits. The scrambling generator period is made much larger than this number of bits by two orders of magnitude (100 times) to make the period appear to be non-repetitive for that day. In exemplary embodiments of the present invention a 128-bit key is used for the scrambling generator with a repeating period of $2^{128}$, which is many billions of times bigger than the data segment of interest, and thus the scrambling data appears to be non repetitive.

The remaining issue for security is to make the scrambling generator sequence as random as possible. Randomness really means that it is unpredictable. It is desirable that the sequence be computationally infeasible for an attacker to predict what the next random bit will be, even knowing all of the previous bits in the stream.

Random bit sequences have the following characteristics: A random sequences should have about the same number of ones and zeros. About half the runs (that is, sequence of the same bit) should be of length one, one quarter of length two, one eighth of length three, and so on. The distribution of run lengths for zeros and ones should be the same. Randomness can be tested with the chi-square test and other tests.

There are many known techniques and information in the literature to ensure that a random sequence is generated over the period of interest using hardware techniques. A particular embodiment of the present invention uses a linear shift register technique. This embodiment uses a 128-bit key to set the initial state of the scrambling generator, with the same key used at both the transmitter and receiver to ensure that the scrambling generators stay in synchronization.

What is claimed is:

1. A method of transmitting data in a wavelength division multiplex system having a plurality of optical channels, the method comprising steps of:
    a scrambler combining respective portions of each one of a plurality of parallel input data streams in accordance with an encryption key to generate a corresponding plurality of parallel scrambled bit streams;
    a transmitter transmitting each scrambled data stream in a respective optical channel of the wavelength division multiplex system;
    a receiver receiving the optical channels and recovering the respective scrambled bit streams; and
    a descrambler processing the recovered scrambled bit streams in accordance with the encryption key to generate a plurality of parallel output data streams corresponding to the plurality of parallel input data streams.

2. The method as claimed in claim 1, wherein each scrambled bit stream is generated by a respective scrambler in accordance with a respective encryption key.

3. The method as claimed in claim 2, wherein each output data stream is generated by a respective descrambler in accordance with the respective encryption key.

4. The method as claimed in claim 2, wherein the respective encryption key of each scrambled bit stream is unique.

5. The method as claimed in claim 1, wherein the plurality of parallel scrambled bit streams are generated by a common scrambler in accordance with a single encryption key.

6. The method as claimed in claim 5, wherein the plurality of parallel output data streams are generated by a common descrambler in accordance with the common encryption key.

7. The method as claimed in claim 1, wherein the encryption key is changed periodically.

8. A system transmitting data in a wavelength division multiplex system having a plurality of optical channels, the system comprising:
- a scrambler for combining respective portions of each one of a plurality of parallel input data streams in accordance with an encryption key to generate a corresponding plurality of parallel scrambled bit streams;
- a transmitter for transmitting each scrambled data stream in a respective optical channel of the wavelength division multiplex system;
- a receiver for receiving the optical channels and recovering the respective scrambled bit streams; and
- a descrambler for processing the recovered scrambled bit streams in accordance with the encryption key to generate a plurality of parallel output data streams corresponding to the plurality of parallel input data streams.

9. The system as claimed in claim 8, wherein each scrambled bit stream is generated by a respective scrambler in accordance with a respective encryption key.

10. The system as claimed in claim 9, wherein each output data stream is generated by a respective descrambler in accordance with the respective encryption key.

11. The system as claimed in claim 9, wherein the respective encryption key of each scrambled bit stream is unique.

12. The system as claimed in claim 8, wherein the plurality of parallel scrambled bit streams are generated by a common scrambler in accordance with a single encryption key.

13. The system as claimed in claim 12, wherein the plurality of parallel output data streams are generated by a common descrambler in accordance with the common encryption key.

14. The system as claimed in claim 8, wherein the encryption key is changed periodically.

* * * * *